United States Patent
Fontignie et al.

(10) Patent No.: US 8,943,291 B2
(45) Date of Patent: Jan. 27, 2015

(54) REORGANIZATION OF SOFTWARE IMAGES BASED ON PREDICTED USE THEREOF

(75) Inventors: Jacques Fontignie, Geneva (CH); Scot MacLellan, Rome (IT); Claudio Marinelli, Aprilia (IT); Paolo Scotton, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/620,398

(22) Filed: Sep. 14, 2012

(65) Prior Publication Data

US 2013/0151805 A1 Jun. 13, 2013

(30) Foreign Application Priority Data

Dec. 13, 2011 (EP) .................................... 11193146

(51) Int. Cl.
*G06F 13/00* (2006.01)
*G06F 13/28* (2006.01)

(52) U.S. Cl.
USPC .................... 711/170; 711/165; 711/E12.002

(58) Field of Classification Search
None
See application file for complete search history.

(56) References Cited

U.S. PATENT DOCUMENTS

| | | | |
|---|---|---|---|
| 7,496,613 B2 | 2/2009 | Raghunath | |
| 7,849,462 B2 | 12/2010 | Traut et al. | |
| 7,856,439 B2 | 12/2010 | Alpern et al. | |
| 8,332,570 B1 | 12/2012 | Cook et al. | |
| 2004/0088504 A1 | 5/2004 | Hsu et al. | |
| 2006/0155735 A1 | 7/2006 | Traut et al. | |
| 2010/0100744 A1 | 4/2010 | Dutta | |
| 2010/0262910 A1 | 10/2010 | Jun et al. | |
| 2011/0078681 A1 | 3/2011 | Li et al. | |
| 2011/0145496 A1* | 6/2011 | Whaley et al. | 711/112 |
| 2011/0283361 A1* | 11/2011 | Perdisci et al. | 726/24 |

OTHER PUBLICATIONS

Examination Report in British Counterpart Application GB1221591.9, dated Mar. 25, 2014 (4 pages).
Combined Search and Examination Report in British Counterpart Application GB1221591.9, dated Jun. 5, 2013 (12 pages).
Examination Report in British Counterpart Application GB1221591.9, dated Jun. 26, 2014 (4 pages).

* cited by examiner

*Primary Examiner* — Eric S Cardwell
(74) *Attorney, Agent, or Firm* — Marcia L. Doubet

(57) ABSTRACT

A solution for managing a software image being stored in a plurality of physical blocks of a storage system comprises monitoring each access to the physical blocks, calculating a predicted sequence of access to the physical blocks according to the monitored accesses, and reorganizing the physical blocks according to the predicted sequence. The monitoring may be performed as the physical blocks are accessed during the booting of virtual images on the software image.

11 Claims, 7 Drawing Sheets

REORGANIZATION OF SOFTWARE IMAGES BASED ON PREDICTED USE THEREOF

CROSS-REFERENCE TO RELATED APPLICATION

The present application claims priority of co-pending European patent application 11193146.5, filed on Dec. 13, 2011.

BACKGROUND

The solution according to one or more embodiments of the present invention generally relates to the data-processing field. More specifically, this solution relates to the management of software images.

The management of software images is a key activity in modern data-processing centers. Generally speaking, a software image is a structure that encapsulates files residing on a (physical or virtual) data-processing machine—for example, storing its operating system, application programs, and/or data. Each data-processing center may then be simply seen as a set of portable software images. The software images are suitable to be moved, copied, replicated, protected, and profiled in a very simple way; as a result, the efficiency of the data-processing center may be strongly increased. These advantages are clearly perceived when the software images are used in virtual machines (i.e., emulations by software of physical machines); indeed, in this case any kind of virtual machine may be provisioned on-demand by simply creating a new virtual machine and then booting it on a desired software image (also referred to as a virtual image in this case). For example, this is particularly useful in cloud computing (wherein multiple data-processing services are provided to client computers being completely agnostic of their physical implementation).

However, the management of the software images may be challenging, especially in large data-processing centers with an image repository providing a centralized access to a very high number of software images (up to several thousands).

For example, a problem that may be suffered when the number of software images increases is their resource consumption of storage devices of the data-processing center (for example, hard-disks) where they are stored. In order to tackle this problem, U.S. Patent Publication 2006/0155735 proposes splitting the software images into segments, which are stored only once in the image repository (so as to avoid the duplication of equal segments in different software images); for this purpose, each software image is represented by a vector pointing to its segments in the order in which they appear in the software image.

Another problem may be due to a latency of the image repository. Indeed, the files of each software image are typically stored within the storage devices in blocks being individually accessible—for example, sectors of a hard disk. However, an access time to each block within the hard disk is relatively high (as compared with its processing time). In order to cope with this problem, pre-fetching techniques are commonly used; in this case, whenever a block is accessed, a set of next blocks is read at the same time from the hard disk and stored into a cache memory, so as to be readily available if requested shortly afterwards.

In any case, the blocks of each file of the software image are generally not contiguous one to another within the hard disk; particularly, the blocks storing an actual content of the file are typically mixed with the blocks of other files (since their position within the hard-disk depends on a corresponding writing time). Therefore, the access in succession to blocks of the software image that are not contiguous strongly degrades their access time. Indeed, due to the mechanical nature of a rotating disk and a moving head of the hard-disk, this increases either the time required by the head to reach a concentric track of the disk storing a next block or the time required by the next block within the track to reach the head; moreover, the cache memory does not work properly, since the pre-fetched blocks may be useless.

In order to alleviate this problem, it might be possible to defragment the hard disk by applying standard tools thereto. In this way, the hard disk would be re-organized by compacting the blocks of each file.

However, this technique is completely ineffective in coping with the latency that is suffered when service information is required to access the files (since it is typically stored in a reserved portion of the hard-disk); moreover, the same applies when different files are accessed in succession (since the corresponding blocks are generally not contiguous within the hard disk).

BRIEF SUMMARY

In its general terms, the solution for managing software images according to one or more embodiments of the present invention is based on reorganizing the software images according to their use.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for managing a software image, wherein its blocks are reorganized according to a predicted sequence of access thereto.

Embodiments of the present invention may alternatively be provided as a computer program, computer program product, and/or system.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content, and representation). Particularly.

DETAILED DESCRIPTION

Figure 1:
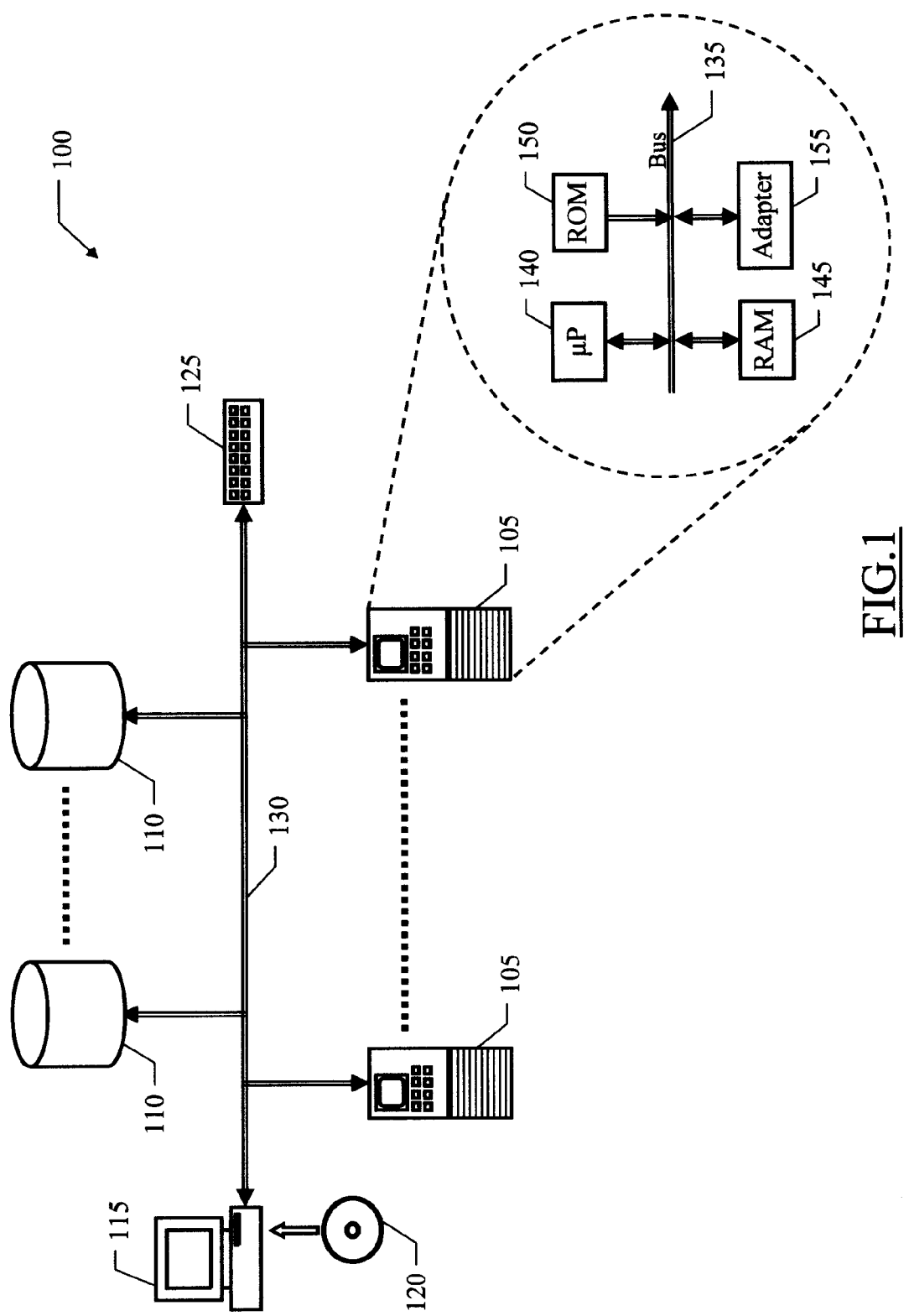
FIG. 1 shows a pictorial representation of a data-processing center that may be used to practice the solution according to an embodiment of the invention.

With reference in particular to FIG. 1, a pictorial representation is shown of a data-processing center 100 that may be used to practice the solution according to an embodiment of the invention.

The data-processing center 100 comprises a set of processing systems 105 (for example, server computers), a set of storage systems 110 (for example, hard-disks), and a console 115 for controlling them—which console 115 may also be provided with a drive for reading DVDs or CDs 120. A router (or switch) system 125 manages communications among the processing systems 105, the storage systems 110, and the console 115, and with the outside of the data-processing center 100 (for example, through the Internet); for this purpose, the processing systems 105, the storage systems 110, the console 115, and the router system 125 are connected through a cabling system 130.

Each processing system 105 is formed by several units that are connected in parallel to a communication bus 135. In detail, a set of (one or more) microprocessors (μg) 140 controls operation of the processing system 105, a RAM 145 is directly used as a working memory by the microprocessors 140, and a ROM 150 stores basic code for a bootstrap of the processing system 105. Moreover, the processing system 105 comprises a network adapter 155, which is used to connect the processing system 105 to the cabling system 130.

Figure 2:
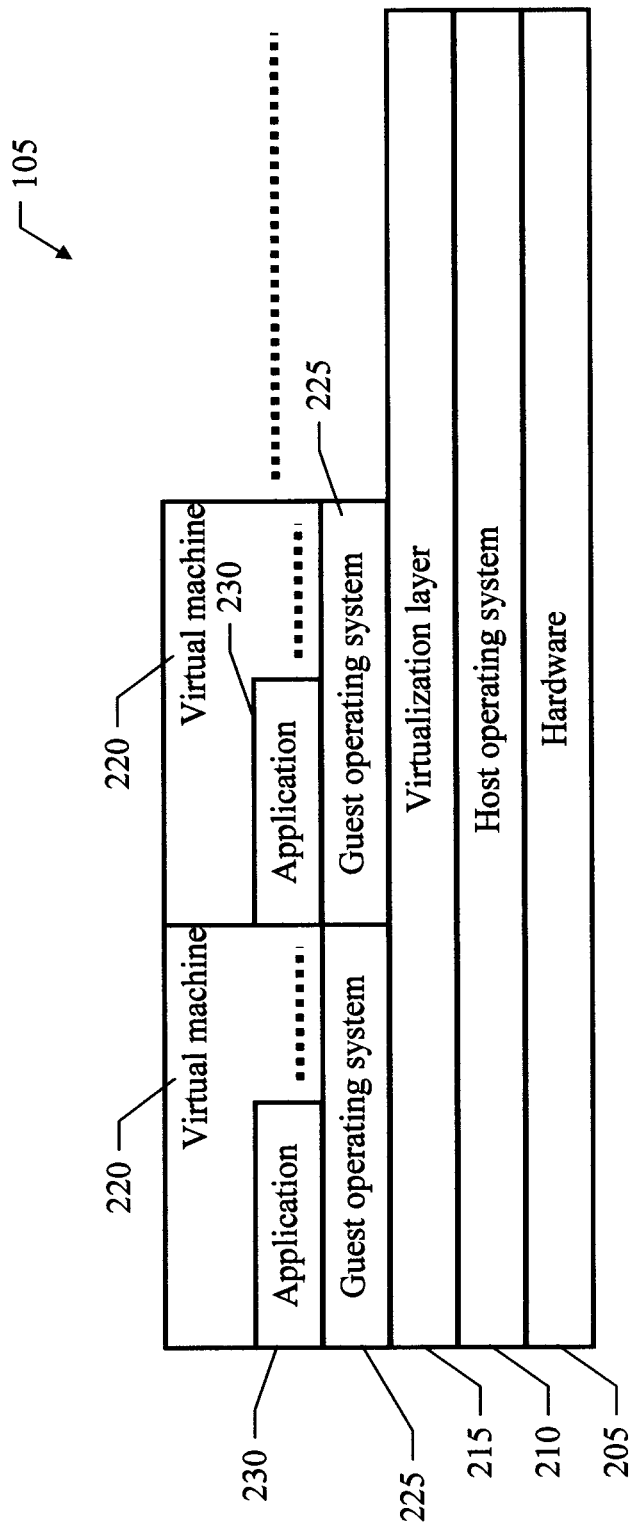
FIG. 2 shows a block diagram of an exemplary virtualized environment wherein the solution according to an embodiment of the invention may be applied.

A block diagram of an exemplary virtualized environment wherein the solution according to an embodiment of the invention may be applied is shown in FIG. 2.

The virtualized environment is implemented on a hardware 205, which is formed by a physical structure comprising several units of the above-described processing systems and storage systems. A host operating system 210 running directly on the hardware 205 defines a software platform on top of which any other program can run. In this specific case, a virtualization layer 215 running on top of the host operating system 210 emulates one or more virtual machines 220, each one formed by an abstract structure emulating a hardware which the virtual machine 220 has sole control of Each virtual machine 220 comprises a guest operating system 225 now running on its emulated hardware. The guest operating system 225 likewise defines a software platform of the virtual machine 220, on top of which one or more application programs 230 run.

Figure 3A:
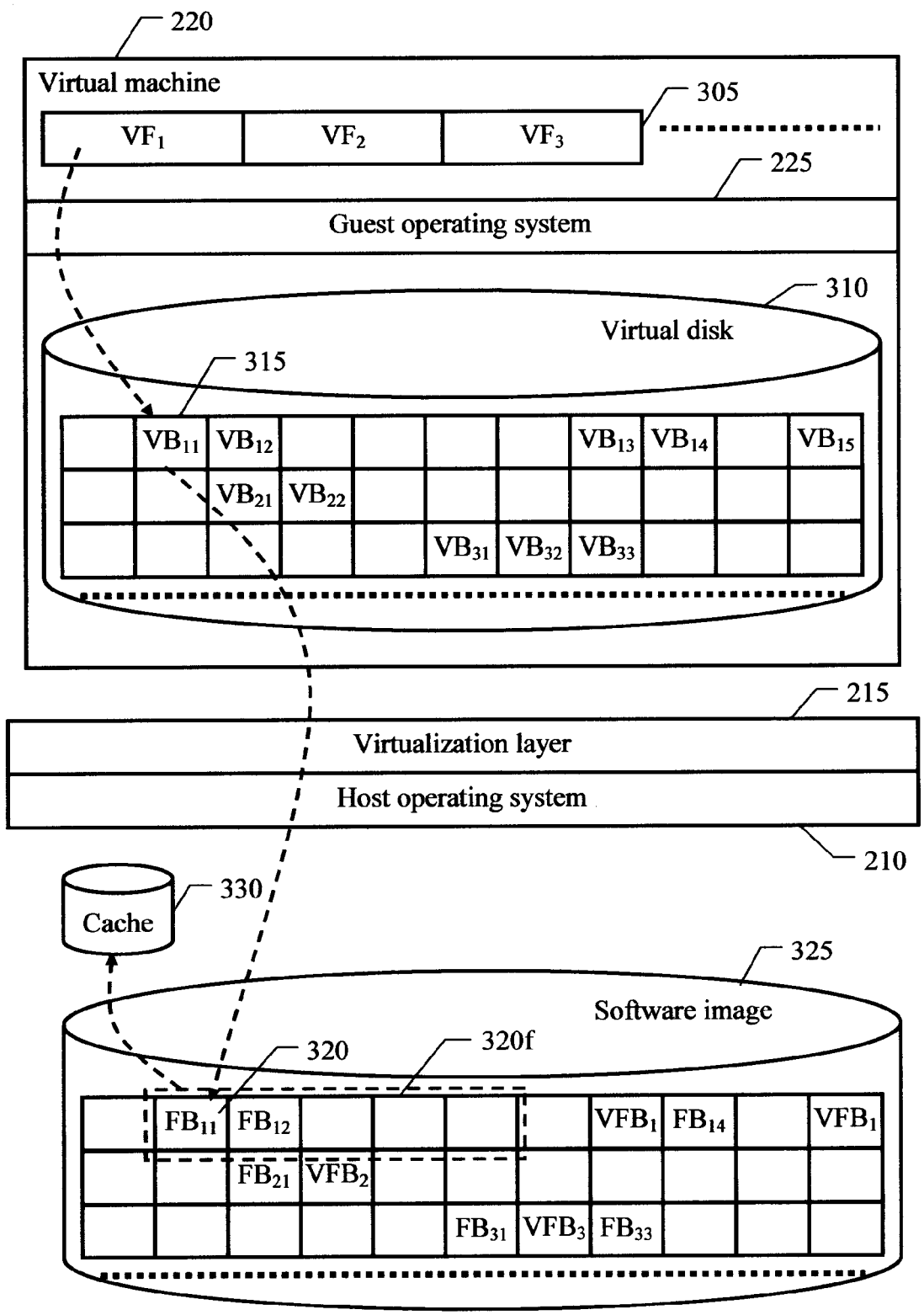
FIG. 3A-FIG. 3B show an exemplary scenario of application of the solution according to an embodiment of the invention.
Figure 3B:
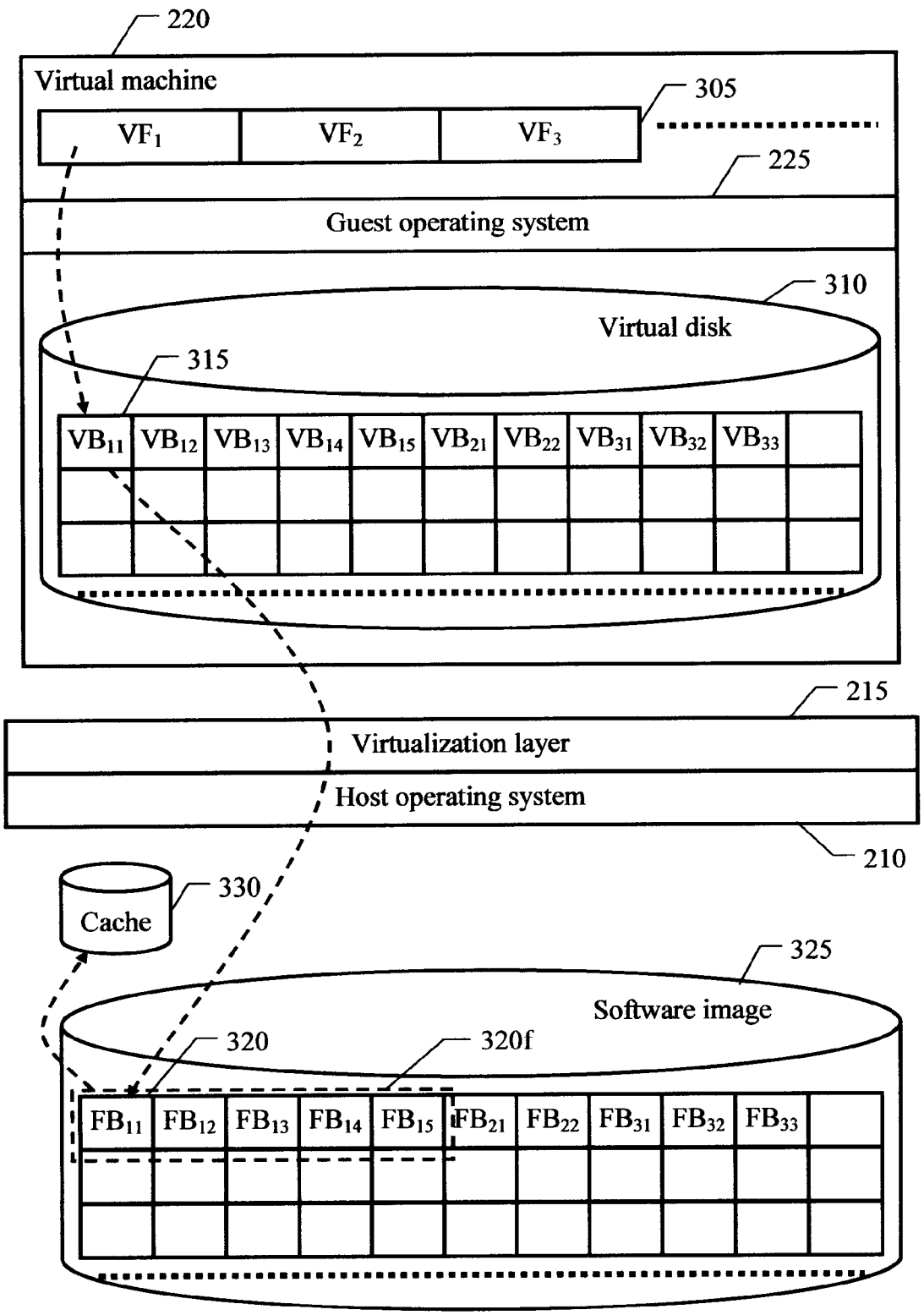

An exemplary scenario of application of the solution according to an embodiment of the invention is shown in FIG. 3A-FIG. 3B.

Starting from FIG. 3A, in each virtual machine 220 the durable data (to remain available even after its current use) is logically organized in virtual files 305 (under the control of a file system of the guest operating system 225). Each virtual file 305 is a logical container of related (durable) data, which is stored in a virtual disk 310 (i.e., an abstract structure emulating a physical disk) of the virtual machine 220. For this purpose, the virtual disk 310 is partitioned into virtual blocks 315, each one being individually accessible by the guest operating system (for reading and/or writing)—for example, each one consisting of 520 bytes. A content of the virtual file 305 is stored in a set of virtual blocks 315 (which position in the virtual disk 310 depends on their writing time). The virtual file 305 is also allocated a descriptor (not shown in the figure), which is stored in further virtual blocks 315; the descriptor comprises details of the virtual file 305 (for example, its name, size, access permissions, creation time, last modification time, last access time, and the like) and indicators for accessing the virtual blocks 315 storing its content. A portion of the virtual disk 310 is reserved to the guest operating system 225 for storing service information, comprising a directory for accessing the descriptors of all the virtual files 305.

The virtual blocks 315 are actually stored in corresponding physical blocks 320 of the storage systems under the control of the virtualization layer 215 (for example, each one consisting of a sector of a physical disk implemented by a specific hard disk of the storage systems). Particularly, each virtual disk 310 is stored in a corresponding software image 325, which consists of a structure encapsulating the content of one or more hard disks (for example, their operating system, application programs, and possible data); the software image 325 is typically stored in one or more physical files of a corresponding physical disk (under the control of the host operating system 210). For this purpose, the virtualization layer 215 maps the virtual blocks 315 of each virtual disk 310 into the corresponding physical blocks 320 of its software image 325. The position of the physical blocks 320 in the software image 325 depends on their writing time, so that they may be not contiguous one to another (and even distributed throughout the whole corresponding physical disk when it is very fragmented).

During operation of the virtual machine 220, the virtual files 305 are continually accessed—for example, by the guest operating system 225 and by the application programs running on it (not shown in the figure). This involves access to the corresponding virtual blocks 315 in the virtual disks 310 (under the control of the guest operating system 225), which in turn involves access to the corresponding physical blocks 320 in the software images 325 (under the control of the virtualization layer 215); for example, the access in succession to three different virtual files 305 denoted as $VF_1$, $VF_2$ and $VF_3$, may involve the access in succession to corresponding virtual blocks 315 denoted as ($VB_{11}$,$VB_{12}$,$VB_{13}$,$VB_{14}$, $VB_{15}$), ($VB_{21}$,$VB_{22}$) and ($VB_{31}$,$VB_{32}$,$VB_{33}$), respectively, and then to corresponding physical blocks 320 of a same software image 325 denoted as ($FB_{11}$,$FB_{12}$,$FB_{13}$,$FB_{14}$, $FB_{15}$), ($FB_{21}$,$FB_{22}$) and ($FB_{31}$,$FB_{32}$,$FB_{33}$), respectively.

Typically, the virtualization layer 215 pre-fetches a set of next physical blocks 320 (for example, 2-10 blocks) when each physical block 320 is accessed—such as the pre-fetched physical blocks denoted with the reference 320f in the figure for the physical block $FB_{11}$. The pre-fetched physical blocks 320f are stored into a cache memory 330; the pre-fetched physical blocks 320f may then be accessed very fast in the cache memory 330 directly (without accessing the software image 325 again) if they are requested shortly afterwards.

As can be seen, when the physical disk storing the software image 325 is very fragmented, the access to the required physical blocks 320 (i.e., the physical blocks $FB_{11}$, $FB_{12}$, $FB_{13}$, $FB_{14}$, $FB_{15}$, $FB_{21}$, $FB_{22}$, $FB_{31}$, $FB_{32}$ and $FB_{33}$ in the example at issue) involves large movements within the software image 325; this strongly increases the access time to the physical blocks 320, because of the typical latency of the physical disk where they are stored. Moreover, in this case the cache memory 330 does not work properly; indeed, the physical blocks 320 to be accessed in succession (within each virtual file 305 and from one to another) are almost never adjacent in the software image 325, so that they cannot be pre-fetched.

Moving to FIG. 3B, in the solution according to an embodiment of the invention each access to the physical blocks 320 is monitored (for example, during a booting on the software image 325 of each virtual machine 220, and/or later on during the running of every software application in the same virtual machine 220). A predicted sequence of access to the physical blocks 320 is calculated according to the monitored accesses (for example, from an access graph representing a corresponding access pattern to the physical blocks 320). The physical blocks 320 are then reorganized in the software image 325 according to this predicted sequence. For example, in the scenario at issue wherein the physical blocks $FB_{11}$, $FB_{12}$, $FB_{13}$, $FB_{14}$, $FB_{15}$, $FB_{21}$, $FB_{22}$, $FB_{31}$, $FB_{32}$ and $FB_{33}$ are accessed in succession, these physical blocks 320 are moved to the beginning of the physical disk storing the software image 325 in the same order. Therefore, if the same virtual blocks $VB_{11}$, $VB_{12}$, $VB_{13}$, $VB_{14}$, $VB_{15}$, $VB_{21}$, $VB_{22}$, $VB_{31}$, $VB_{32}$ and $VB_{33}$ are accessed in the same order later on (for example, when another virtual machine 220 boots on the same software image 325), the corresponding physical blocks $FB_{11}$, $FB_{12}$, $FB_{13}$, $FB_{14}$, $FB_{15}$, $FB_{21}$, $FB_{22}$, $FB_{31}$, $FB_{32}$ and $FB_{33}$ are now contiguous in the software image 325.

The above-described solution strongly reduces the latency of the software image 325. Indeed, in this way it is very likely that contiguous physical blocks 320 are accessed in succession. This has a beneficial effect on their access time; moreover, it allows pre-fetching the next physical blocks 320 so as to exploit the cache memory 330 at its best.

The desired result is achieved by taking into account the actual use that is expected of the software image 325. Therefore, this solution is very effective in reducing the access time of the physical blocks 320 both within each virtual file 305 and among consecutive virtual files 305.

The proposed technique is particularly advantageous in the above-described embodiment (wherein the software images 325 are accessed by virtual machines 220); indeed, in this case it is possible to reduce the access time of the physical blocks 320 at the level of both the content and the service information of the virtual files 305.

Figure 4A:
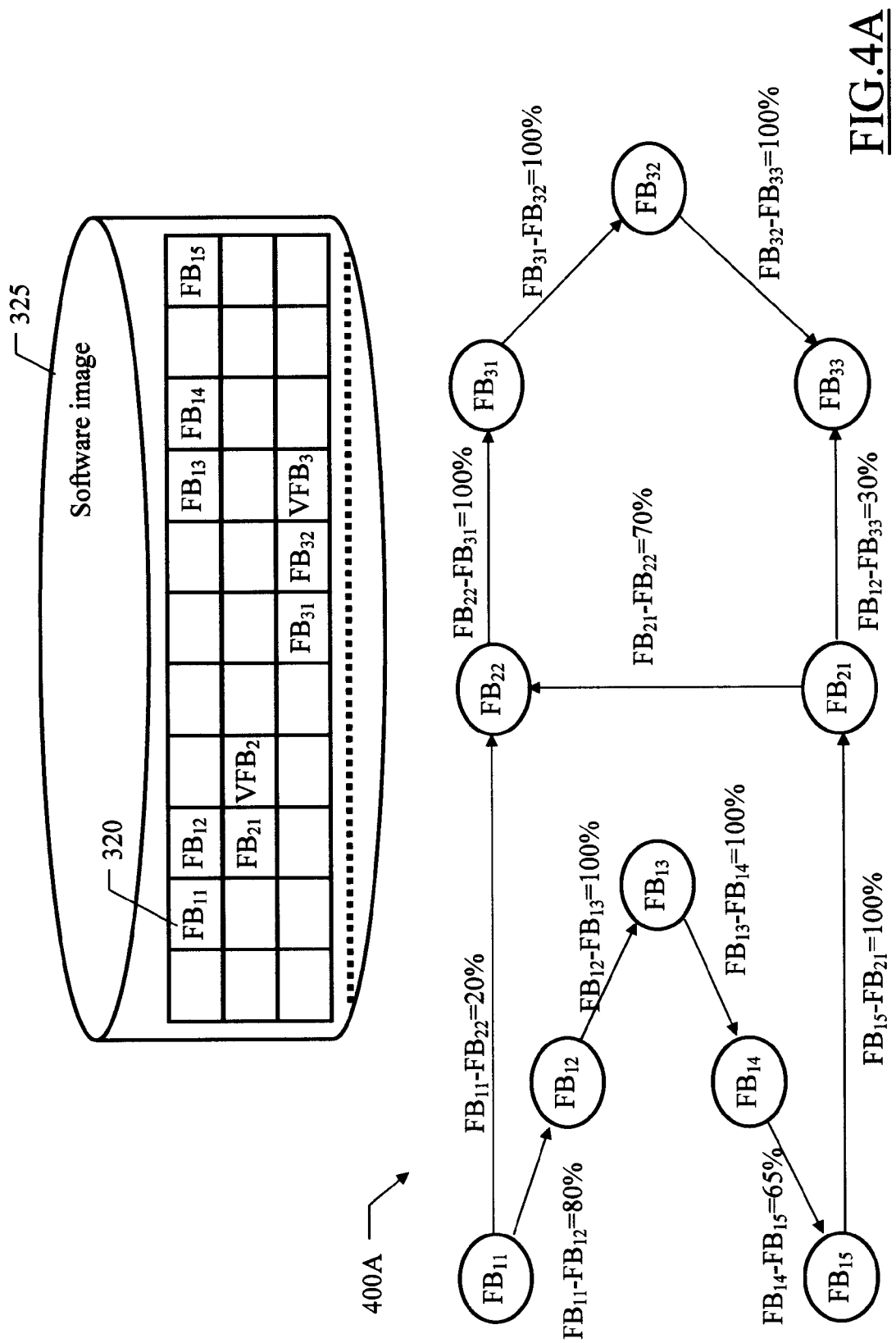
FIG. 4A-FIG. 4B show an exemplary implementation of the solution according to an embodiment of the invention.
Figure 4B:
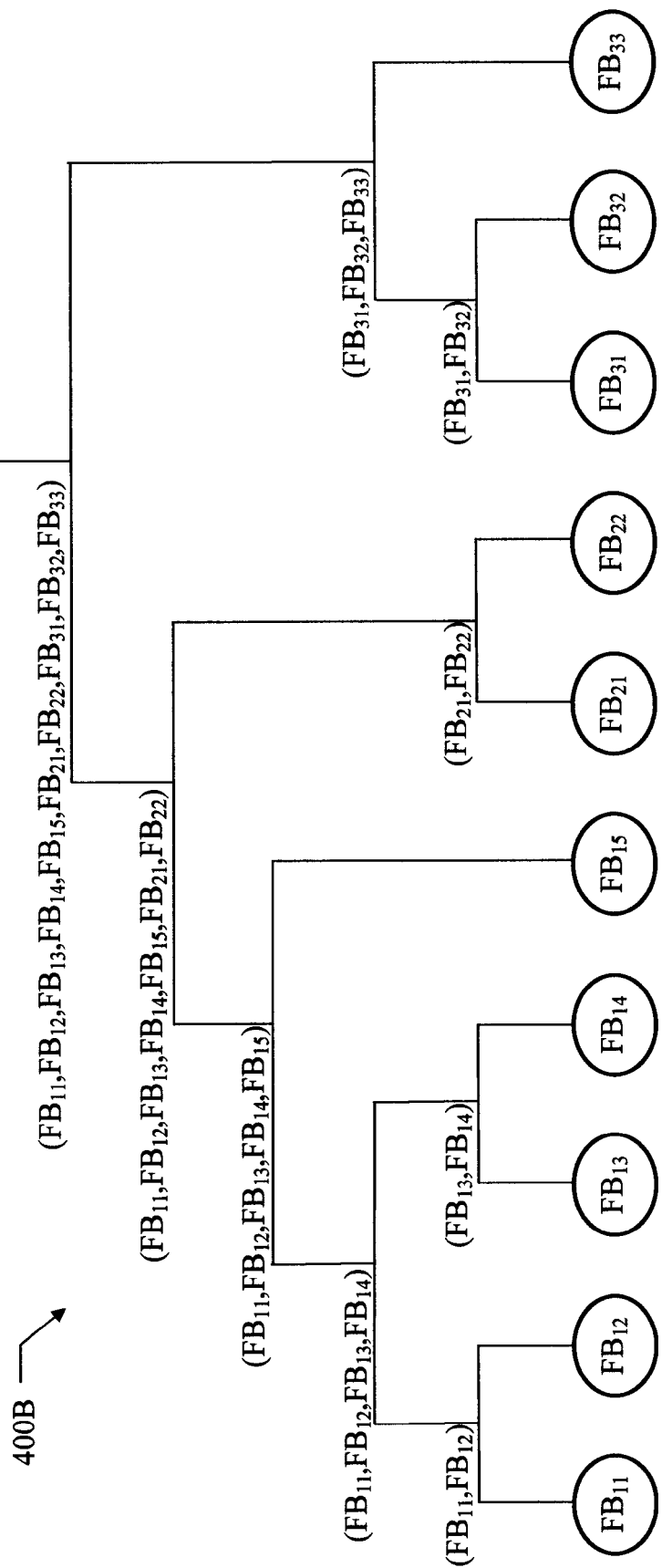

An exemplary implementation of the solution according to an embodiment of the invention is shown in FIG. 4A-FIG. 4B.

Starting from FIG. 4A, an access graph 400A is determined according to the monitored accesses to the physical blocks 320. The access graph 400A has a set of nodes; each node represents a corresponding physical block 320 (at least for the physical blocks 320 that have been accessed one or more times). In the example at issue, the access graph 400A comprises ten nodes representing the physical blocks $FB_{11}$, $FB_{12}$, $FB_{13}$, $FB_{14}$, $FB_{15}$, $FB_{21}$, $FB_{22}$, $FB_{31}$, $FB_{32}$ and $FB_{33}$ (denoted with the same references for the sake of simplicity).

The access graph 400A further has a set of ordered edges, each one between a corresponding pair of nodes $FB_{11}$-$FB_{33}$ (denoted by joining their two references); each edge ($FB_{11}$-$FB_{12}$)-($FB_{32}$-$FB_{33}$) represents a probability of a consecutive access of the corresponding physical blocks 320 (at least between the physical blocks 320 that have been accessed in succession one or more times). In the example at issue, the probability of consecutive access between the different pairs of physical blocks 320 is:

$FB_{11}$-$FB_{12}$=80%
$FB_{11}$-$FB_{22}$=20%
$FB_{12}$-$FB_{13}$=100%
$FB_{13}$-$FB_{14}$=100%
$FB_{14}$-$FB_{15}$=65%
$FB_{15}$-$FB_{21}$=100%
$FB_{21}$-$FB_{22}$=70%
$FB_{22}$-$FB_{31}$=100%
$FB_{21}$-$FB_{33}$=30%
$FB_{31}$-$FB_{32}$=100%
$FB_{32}$-$FB_{33}$=100%.

Moving to FIG. 4B, a dendogram 400B is created from the above-described access graph. The dendogram 400B is a tree graph that represents a grouping of the nodes of the access graph in communities according to the probability of accessing the corresponding physical blocks in succession (as defined by their edges)—i.e., with the probability of accessing the physical blocks in succession that is high within each community and low between different communities at every level of the tree. The dendogram 400B may be created with any known algorithms for finding communities (for example, the Girvan-Newman algorithm).

The dendogram 400B has a set of leaves; each leaf represents a corresponding node of the access graph, and then the corresponding physical block (and it is denoted with the same reference $FB_{11}$-$FB_{33}$ for the sake of simplicity). The dendogram 400B further has a tree of internal vertexes, moving bottom-up from the leaves $FB_{11}$-$FB_{33}$ to a root representing a community of all the nodes of the access graph (and denoted with their references ($FB_{11}$,$FB_{12}$,$FB_{13}$,$FB_{14}$,$FB_{15}$,$FB_{21}$, $FB_{22}$,$FB_{31}$,$FB_{32}$,$FB_{33}$)); each internal edge represents a corresponding community of physical nodes, and then the combined probability of their consecutive access (and it is denoted with their references). In the example at issue, a first level of internal vertexes (just above the leaves $FB_{11}$-$FB_{33}$) represents the communities ($FB_{11}$,$FB_{12}$), ($FB_{13}$,$FB_{14}$), ($FB_{21}$,$FB_{22}$) and ($FB_{31}$,$FB_{32}$). A second level of internal vertexes represents the communities ($FB_{11}$,$FB_{12}$,$FB_{13}$,$FB_{14}$) and ($FB_{31}$,$FB_{32}$,$FB_{33}$). A third level of internal vertexes represents the community ($FB_{11}$,$FB_{12}$,$FB_{13}$,$FB_{14}$,$FB_{15}$). A fourth level of internal vertexes (just below the root ($FB_{11}$, $FB_{12}$,$FB_{13}$,$FB_{14}$,$FB_{15}$,$FB_{21}$,$FB_{22}$,$FB_{31}$,$FB_{32}$,$FB_{33}$)) represents the community ($FB_{11}$,$FB_{12}$,$FB_{13}$,$FB_{14}$,$FB_{15}$,$FB_{21}$, $FB_{22}$).

The arrangement of the leaves $FB_{11}$-$FB_{33}$ in the dendogram 400B directly defines the predicted sequence of access to the corresponding physical blocks—i.e., $FB_{11}$, $FB_{12}$, $FB_{13}$, $FB_{14}$, $FB_{15}$, $FB_{21}$, $FB_{22}$, $FB_{31}$, $FB_{32}$ and $FB_{33}$ in the example at issue.

Figure 5:
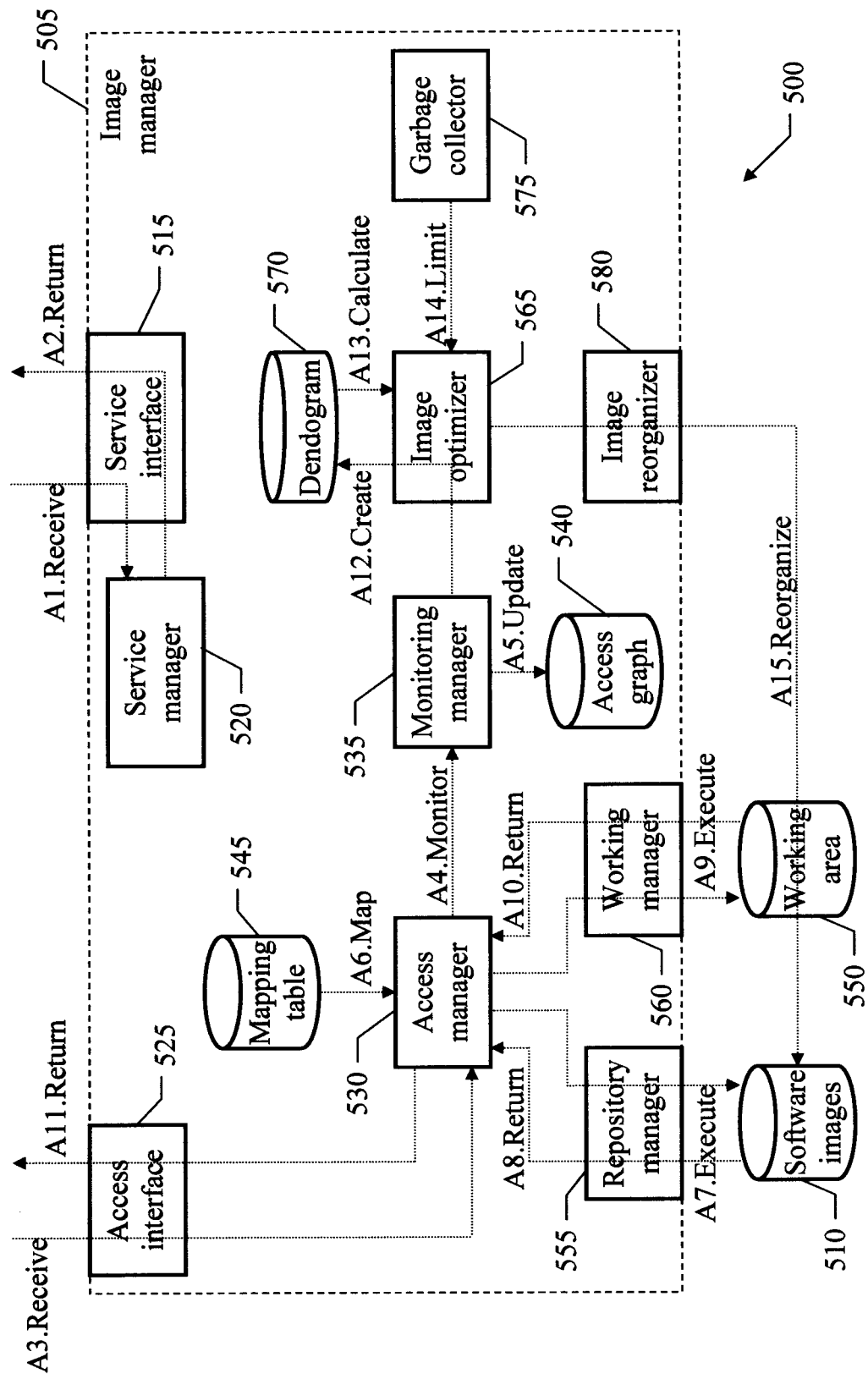
FIG. 5 shows a collaboration diagram representing the roles of the main software modules that may be used to implement the solution according to an embodiment of the invention.

With reference now to FIG. 5, a collaboration diagram is shown representing the roles of the main software modules that may be used to implement the solution according to an embodiment of the invention. These software modules are denoted as a whole with the reference 500. The information (programs and data) is typically stored in the storage systems of the above-described data-processing center and loaded (at least partially) into the working memory of a generic processing system thereof (for example, a server computer managing a set of software images that are available for use in the data-processing center) when the programs are running The programs are initially installed onto the storage systems, for example, from DVDs (through the console of the data-processing center). Particularly, the figure describes both the static structure of the software modules and their dynamic behavior (by means of a series of exchanged messages, each one representing a corresponding action, denoted with sequence numbers preceded by the symbol "A").

Particularly, an image manager 505—for example, implemented in a provisioning tool, such as the IBM® Tivoli® Provisioning Manager for Images (or TPMfI) of the IBM Tivoli Provisioning Manager for OS Deployment (or TPM for OSD) by IBM Corporation—manages the software images (denoted as a whole with the reference 510) that are stored in a corresponding repository. ("IBM" and "Tivoli" are registered trademarks of International Business Machines Corporation in the United States, other countries, or both.)

For this purpose, the image manager 505 comprises a service interface 515; the service interface 515 exposes a set of Application Program Interfaces (APIs) for performing a number of service operations (for example, configuring the image manager 505 and collecting statistics therefrom). Whenever the service interface 515 receives a corresponding service command (for example, submitted by a system administrator through the console), it passes the service command to a service manger 520 (action "A1.Receive"). In response thereto, the service manager 520 executes the service operation indicated in the service command (for example, configuring the image manager 505 accordingly or collecting the requested statistics) and it returns a corresponding result, if it is necessary (action "A2.Return").

In addition, the image manager 505 comprises an access interface 525; the access interface 525 exposes a set of further APIs for accessing a selected physical block of a selected software image 510 (for example, for reading and/or writing it). Whenever the access interface 525 receives a corresponding access command (for example, submitted by a virtual machine booting on the selected software image 510, or by the operating system or an application program running on a virtual machine mounting the selected software image 510), it passes the access command to an access manger 530 (action "A3.Receive"). In response thereto, the access manager 530 passes the access command to a monitoring manager 535 in charge of monitoring the accesses to the software images 510 (action "A4.Monitor"). The monitoring agent 535 controls a repository storing a representation of the access graph of each software image 510 (denoted as a whole with the reference 540); in response to each access command, the monitoring manager 535 updates the corresponding access graph 540 accordingly. More specifically, the monitoring manager 535 adds a node for the selected physical block to the access graph 540 if necessary (i.e., if the selected physical block is accessed for the first time) and an edge from the node of a previously selected physical block (accordingly flagged by the monitoring manager 535 previously) to the node of the selected physical block if necessary (i.e., if the previously selected physical block and the selected physical block are accessed in succession for the first time). In any case, the monitoring manager 535 then recalculates the probability of accessing each physical block whose node is connected to the node of the previously selected physical block (action "A5.Update").

The monitoring manager 530 also controls a repository storing a mapping table for each software image 510 (denoted as a whole with the reference 545). For each physical block of each software image 510 (identified by its address within it), the mapping table 545 indicates whether the physical block is actually stored in the repository of the software images 510 or in a working area 550 (described in detail in the following); for each physical block stored in the working area 550, the mapping table 545 also indicates its address within it (mapping its address within the software image 510). In response to the same access command, the access manager 530 further verifies whether the selected physical block is stored in the selected software image 510 or in the working area 550 (as indicated in the mapping table 545); in the latter case, the access manager 530 maps the address of the selected physical block in the selected software image 510 (indicated in the access command) to the address thereof in the working area 550 (indicated in the mapping table 545)—action "A6.Map".

When the selected physical block is stored in the selected software image 510, the access manager 530 passes the access command to a repository manager 555, which executes it on the selected software image 510—for example, by reading or writing the selected physical block (action "A7.Execute"). The repository manager 555 returns a corresponding result to the access manager 530, if it is necessary (action "A8.Return"). Conversely, when the selected physical block is stored in the working area 550, the access manager 530 modifies the access command by replacing the address of the selected physical block in the selected software image 510 with its address in the working area 550; the access manager 550 then passes the (modified) access command to a working manager 560, which executes it on the working area 550 as above (action "A9.Execute"). Likewise, the working manager 560 returns a corresponding result to the access manager 530, if it is necessary (action "A10.Return"). In both cases, the access manager 530 returns the result of the execution of the access command (if any) through the access interface 525 (action "A11.Return").

In a completely asynchronous way (for example, periodically every 1-7 days), an image optimizer 565 is invoked. The image optimizer 565 retrieves each access graph 540, and it creates the corresponding dendogram; all the dendograms so obtained (denoted as a whole with the reference 570) are stored into a corresponding repository (action "A12.Create"). From each dendogram 570, the image optimizer 565 calculates the predicted sequence of access to the physical blocks of the corresponding software image 510; the predicted sequence comprises the physical blocks corresponding to the leaves of the dendogram 570, with the addition of the other physical blocks of the software image 510 (i.e., the physical blocks that do not have a corresponding leaf in the dendogram 570 since they have not been accessed yet) at the end thereof (action "A13.Calculate"). With a far higher periodicity (for example, once every 4-20 times the image optimizer 565 is invoked—i.e., every 1-2 months), the image optimizer 565 invokes a garbage collector 575; the garbage collector 575 determines the (unused) physical blocks that have not been accessed since its previous invocation (for example, as indicated by their corresponding last access time). The garbage collector 575 limits each predicted sequence by removing the unused physical blocks thereof, and it deletes the corresponding nodes (if it is necessary) from the corresponding access graph 540 (action "A14.Limit"). In any case, for each software image 510, the image optimizer 565 then verifies whether the (possible limited) predicted sequence significantly differs from the current arrangement of the physical blocks in the software image 510 (as previously stored)—for example, when a defragmentation percentage from the current arrangement to the predicted sequence exceeds a threshold value (such as 10-20%). If so, the image optimizer 565 passes the predicted sequence to an image reorganizer 580. In response thereto, the image reorganizer 580 reorganizes the software image 510 according to the predicted sequence. For this purpose, the image reorganizer 580 copies the physical blocks (in succession along the predicted sequence) from the software image 510 to consecutive locations of the working area 550; at the same time, the image reorganizer 580 updates the corresponding information in the mapping table 545. Once the whole software image 510 has been copied into the working area 550 (with the possible exclusion of its unused physical blocks), the two structures are swapped and the corresponding portion of the working area 550 is deleted; at the same time, the image reorganizer 580 updates the corresponding information in the mapping table 545. In this way, the software image 510 now has its physical blocks arranged according to the predicted sequence; at the same time, it is also possible to remove any unused physical blocks from the software image 510 so as to reduce its size (action "A15.Reorganize").

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions, and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, the terms include, comprise, have, and contain (and any forms thereof) should be intended with an open, non-exhaustive meaning (i.e., not limited to the recited items); the terms based on, dependent on, according to, function of (and any forms thereof) should be intended as a non-exclusive relationship (i.e., with possible further variable involved); and the term a/an should be intended as one or more items (unless expressly indicated otherwise).

For example, an embodiment of the invention provides a method for managing a software image (of any type); the software image is stored in a plurality of physical blocks (of any size and format) of a storage system (of any type, for example, optical disks). The method comprises the following steps. Each access to the physical blocks is monitored (in any way, for example, with hooking techniques). A predicted sequence of access to the physical blocks is calculated according to the monitored accesses (with any algorithm). The physical blocks are then reorganized according to the predicted sequence (with any frequency, for example, after a predetermined number of accesses to the physical blocks, and in any way, for example, off-line as well).

However, the same solution may be implemented with an equivalent method (by using similar steps with the same functions of more steps or portions thereof, removing some steps being non-essential, or adding further optional steps); moreover, the steps may be performed in a different order, concurrently or in an interleaved way (at least in part).

In an embodiment of the invention, the method further comprises the step of accessing the physical blocks by a plurality of virtual machines.

However, the virtual machines may be implemented in any other way (for example, under the control of a hypervisor directly running on the hardware without any host operating system); in any case, the same technique is suitable to be applied to physical machines as well.

In an embodiment of the invention, the step of accessing the physical blocks by a plurality of virtual machines comprises booting each virtual machine on the software image.

However, the software images may also be simply mounted on virtual machines that have already been booted.

In an embodiment of the invention, the step of monitoring each access to the physical blocks comprises monitoring each access to the physical blocks during the booting of each virtual machine on the software image.

However, the virtual machines may boot on the software image in any way (for example, with a streaming technique).

In an embodiment of the invention, the step of monitoring each access to the physical blocks comprises monitoring each access to the physical blocks by each software application running on the virtual machines.

However, the monitoring may be performed only in one of the above-mentioned modes, in both of them, or in any other way (for example, only for the physical blocks not reserved to the host operating system).

In an embodiment of the invention, the step of monitoring each access to the physical blocks comprises determining an access pattern to the physical blocks according to the monitored accesses; the step of calculating a predicted sequence then comprises determining the predicted sequence from the access pattern.

However, the predicted sequence may also be determined directly from the monitored accesses, even without the need of creating any intermediate structure (for example, with fuzzy logic techniques).

In an embodiment of the invention, the step of determining an access pattern comprises updating an access graph, which has a set of nodes and a set of edges (each one between a corresponding pair of nodes); each node represents a physical block and each edge represents a probability of a consecutive access of the corresponding physical blocks.

However, the access graph may have any other structure (for example, with each edge representing the consecutive access between the corresponding physical blocks in both directions); in any case, the access pattern may be defined in any other way (for example, with a neural network).

In an embodiment of the invention, the step of determining the predicted sequence from the access pattern comprises grouping the nodes into communities according to the corresponding edges, and determining the predicted sequence from said communities.

However, the communities may be determined with any other algorithm (for example, the minimum-cut method, hierarchical clustering, modularity maximization, the Louvain method, or the Clique based method).

In an embodiment of the invention, the step of determining the predicted sequence from the access pattern comprises creating a dendogram from the access graph; the dendogram has a plurality of leaves representing the nodes of the graph and a plurality of internal vertexes representing said communities. The predicted sequence is determined according to the leaves of the dendogram.

However, the dendogram may be created in any other way, even without creating any access graph (for example, either with a bottom-up or a top-down approach); in any case, the predicted sequence may also be determined without creating any dendogram.

In an embodiment of the invention, the method further comprises the steps of determining a set of unused physical blocks according to the monitored accesses, and removing the unused physical blocks from the software image.

However, the unused physical blocks may be determined in any other way (for example, by considering only the physical blocks that have never been accessed at all); in any case, an implementation of the same solution without any garbage collection is contemplated.

An embodiment of the invention provides a computer program, which comprises code for causing a data-processing system (for example, the above-described data-processing center) to perform the steps of the proposed method when the computer program is executed on the system.

However, the program may be implemented as a stand-alone module, as a plug-in for the provisioning tool, or even directly in the provisioning tool itself. It would be readily apparent that it is also possible to deploy the same solution as a service that is accessed through a network (such as in the Internet). In any case, similar considerations apply if the program is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations; particularly, the program may be in the form of external or resident software, firmware, or micro-code (either in object code or in source code—for example, to be compiled or interpreted). Moreover, it is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are fixed disks (where the program may be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed or otherwise configured.

An embodiment of the invention provides a data-processing system (for example, the above-described data-processing center), which performs the steps of the same method.

However, similar considerations apply if the data-processing system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. More specifically, the same method may also be carried out on a data-processing system based on a different architecture (for example, a local, wide area, global, cellular, or satellite network), and exploiting any type of (wired and/or wireless) connections; moreover, its implementation on a stand-alone computer is not excluded. In any case, each computer of the data-processing center may have another structure or may comprise similar elements (such as cache memories temporarily storing the programs or parts thereof); moreover, it is possible to replace the computer with any code execution entity, either based on a physical machine or a virtual machine (such as a PDA, a mobile phone, and the like), or with a combination of multiple entities (such as a multi-tier architecture, a grid computing infrastructure, and the like).

The invention claimed is:

1. A method for managing a software image being stored in a plurality of physical blocks of a storage system, the method comprising:
   monitoring each access to the physical blocks;
   calculating a predicted sequence of access to the physical blocks according to the monitored accesses by creating an access graph to represent the accesses as monitored, wherein:
   the access graph contains a plurality of nodes and edges;
   each of the plurality of nodes corresponds to a distinct one of the accessed physical blocks;
   each of the edges connects a distinct pair of the nodes and is ordered to indicate that, for a first of the nodes in the pair, the monitored accesses indicate that at least one access to the physical block to which the first of the nodes in the pair corresponds is followed directly in sequence by an access to the physical block to which a second of the nodes in the pair corresponds; and
   associated with each of the edges is a probability value representing a predicted likelihood that any access to the physical block to which the first of the nodes in the pair corresponds is followed directly in sequence by the access to the physical block to which the second of the nodes in the pair corresponds; and
   reorganizing the physical blocks according to the predicted sequence, comprising moving at least one of the physical blocks from a first location in the storage system to a different location in the storage system.

2. The method according to claim 1, wherein the accessing of the physical blocks is performed by a plurality of virtual machines.

3. The method according to claim 2, wherein the accessing comprises:
   booting each virtual machine on the software image.

4. The method according to claim 3, wherein the monitoring comprises:
   monitoring each access to the physical blocks during the booting of each virtual machine on the software image.

5. The method according to claim 2, wherein the accessing of
   the physical blocks is performed by each software application running on the virtual machines.

6. The method according to claim 1, wherein:
   calculating the predicted sequence of access comprises using the predicted likelihood associated with each of the edges to determine, for each of the accessed physical blocks, a most-likely next one of the accessed physical blocks to be accessed in the sequence of access.

7. The method according to claim 1, wherein the calculating further comprises:
   grouping the nodes of the access graph into communities according to the probability value associated with the edges connecting the nodes; and
   determining the predicted sequence of access from the communities.

8. The method according to claim 7, wherein the calculating further comprises:
   creating a dendogram corresponding to the access graph, the dendogram having a plurality of leaves and a plurality of internal vertexes, wherein:
   each of the leaves represents a distinct one of the nodes of the access graph and therefore the physical block to which the distinct one corresponds; and
   each of the internal vertexes represents a distinct one of the communities and a combination of the probability values associated with the edges connecting the nodes grouped into the distinct one of the communities, thereby causing the leaves of the dendogram to be ordered; and setting the predicted sequence of access to match the order of the leaves of the dendogram.

9. The method according to claim 1, further comprising:
determining a set of unused physical blocks according to the monitored accesses; and
removing the unused physical blocks from the software image.

10. A computer program product for managing a software image stored in a plurality of physical blocks of a storage system, the computer program product comprising computer-readable program code which is stored on a non-transitory machine-readable storage medium and which, when executed on a computer of a data-processing system, causes the computer to perform:
monitoring each access to the physical blocks;
calculating a predicted sequence of access to the physical blocks according to the monitored accesses by creating an access graph to represent the accesses as monitored, wherein:
the access graph contains a plurality of nodes and edges;
each of the plurality of nodes corresponds to a distinct one of the accessed physical blocks;
each of the edges connects a distinct pair of the nodes and is ordered to indicate that, for a first of the nodes in the pair, the monitored accesses indicate that at least one access to the physical block to which the first of the nodes in the pair corresponds is followed directly in sequence by an access to the physical block to which a second of the nodes in the pair corresponds; and
associated with each of the edges is a probability value representing a predicted likelihood that any access to the physical block to which the first of the nodes in the pair corresponds is followed directly in sequence by the access to the physical block to which the second of the nodes in the pair corresponds; and
reorganizing the physical blocks according to the predicted sequence, comprising moving at least one of the physical blocks from a first location in the storage system to a different location in the storage system.

11. A data-processing system for managing a software image stored in a plurality of physical blocks of a storage system, comprising:
a computer comprising a processor; and
instructions which are executable, using the processor, to perform functions comprising:
monitoring each access to the physical blocks;
calculating a predicted sequence of access to the physical blocks according to the monitored accesses by creating an access graph to represent the accesses as monitored, wherein:
the access graph contains a plurality of nodes and edges;
each of the plurality of nodes corresponds to a distinct one of the accessed physical blocks;
each of the edges connects a distinct pair of the nodes and is ordered to indicate that, for a first of the nodes in the pair, the monitored accesses indicate that at least one access to the physical block to which the first of the nodes in the pair corresponds is followed directly in sequence by an access to the physical block to which a second of the nodes in the pair corresponds; and
associated with each of the edges is a probability value representing a predicted likelihood that any access to the physical block to which the first of the nodes in the pair corresponds is followed directly in sequence by the access to the physical block to which the second of the nodes in the pair corresponds; and
reorganizing the physical blocks according to the predicted sequence, comprising moving at least one of the physical blocks from a first location in the storage system to a different location in the storage system.

\* \* \* \* \*